United States Patent
Lu et al.

(10) Patent No.: US 9,486,735 B2
(45) Date of Patent: Nov. 8, 2016

(54) COMPOSITE OXYGEN TRANSPORT MEMBRANE

(71) Applicants: Zigui Lu, East Amherst, NY (US); Pawel J. Plonczak, Amherst, NY (US); Jonathan A. Lane, Snyder, NY (US)

(72) Inventors: Zigui Lu, East Amherst, NY (US); Pawel J. Plonczak, Amherst, NY (US); Jonathan A. Lane, Snyder, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 0 days.

(21) Appl. No.: 14/856,038

(22) Filed: Sep. 16, 2015

(65) Prior Publication Data
US 2016/0001221 A1 Jan. 7, 2016

Related U.S. Application Data (63) Continuation-in-part of application No. 14/322,981, filed on Jul. 3, 2014, which is a continuation of application No. 13/644,666, filed on Oct. 4, 2012, now Pat. No. 8,795,417.

(60) Provisional application No. 61/576,108, filed on Dec. 15, 2011.

(51) Int. Cl.
*B01D 53/22* (2006.01)
*B01D 69/12* (2006.01)
(Continued)

(52) U.S. Cl.
CPC ......... *B01D 53/228* (2013.01); *B01D 67/0041* (2013.01); *B01D 69/02* (2013.01);
(Continued)

(58) Field of Classification Search
CPC B01D 53/228; B01D 67/0041; B01D 69/02; B01D 69/12; B01D 71/024; B01D 71/028; B01D 2255/204; B01D 2255/2063; B01D 2255/20738; B01D 2255/20784; B01D 2255/40; B01D 2255/402; B01D 2255/407; B01D 2255/902; B01D 2256/12; B01D 2257/104; B01D 2258/06; B01D 2325/023; B01J 19/2475; B01J 2219/24; C01B 13/0255; C04B 35/01; C04B 35/016; C04B 35/2633; C04B 35/42; C04B 35/44; C04B 35/462; C04B 35/488; C04B 38/02; C04B 2111/00612; C04B 2111/00801; C04B 2111/0081; C04B 2235/3208; C04B 2235/3217; C04B 2235/3222; C04B 2235/3224; C04B 2235/3225; C04B 2235/3227; C04B 2235/3229; C04B 2235/3232; C04B 2235/3234; C04B 2235/3243; C04B 2235/3246; Y10T 428/1314; Y10T 428/24997; Y10T 428/24999

See application file for complete search history.

(56) References Cited

U.S. PATENT DOCUMENTS 2,593,507 A 4/1952 Wainer
2,692,760 A 10/1954 Flurschutz
(Continued)

FOREIGN PATENT DOCUMENTS

EP 0926096 A1 6/1999
EP 0984500 A2 3/2000
(Continued)

OTHER PUBLICATIONS

Switzer et al., "Cost and Feasability Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
(Continued)

*Primary Examiner* — Anthony Shumate
(74) *Attorney, Agent, or Firm* — Ralph J. Mancini (57) ABSTRACT

A method is described of producing a composite oxygen ion membrane and a composite oxygen ion membrane in which a porous fuel oxidation layer and a dense separation layer and optionally, a porous surface exchange layer are formed on a porous support from mixtures of $(Ln_{1-x}A_x)_wCr_{1-y}B_yO_{3-\delta}$ and a doped zirconia. Preferred materials are $(La_{0.8}Sr_{0.2})_{0.95}Cr_{0.7}Fe_{0.3}O_{3-\delta}$ for the porous fuel oxidation layer, $(La_{0.8}Sr_{0.2})_{0.95}Cr_{0.5}Fe_{0.5}O_{3-\delta}$ for the dense separation layer, and $(La_{0.8}Sr_{0.2})_{0.95}Cr_{0.3}Fe_{0.7}O_{3-\delta}$ for the porous surface exchange layer. Firing the said fuel activation and separation layers in nitrogen atmosphere unexpectedly allows the separation layer to sinter into a fully densified mass.

19 Claims, 1 Drawing Sheet

(51) Int. Cl.
  *B01D 71/02* (2006.01)
  *B01D 67/00* (2006.01)
  *B01J 19/24* (2006.01)
  *B01D 69/02* (2006.01)
  *C04B 35/01* (2006.01)
  *C04B 35/26* (2006.01)
  *C04B 35/42* (2006.01)
  *C04B 35/44* (2006.01)
  *C04B 35/462* (2006.01)
  *C04B 35/488* (2006.01)
  *C04B 38/02* (2006.01)
  *C01B 13/02* (2006.01)
  *C04B 111/00* (2006.01)

(52) U.S. Cl.
  CPC ........... *B01D 69/12* (2013.01); *B01D 71/024* (2013.01); *B01D 71/028* (2013.01); *B01J 19/2475* (2013.01); *C04B 35/01* (2013.01); *C04B 35/016* (2013.01); *C04B 35/2633* (2013.01); *C04B 35/42* (2013.01); *C04B 35/44* (2013.01); *C04B 35/462* (2013.01); *C04B 35/488* (2013.01); *C04B 38/02* (2013.01); *B01D 2255/204* (2013.01); *B01D 2255/2063* (2013.01); *B01D 2255/20738* (2013.01); *B01D 2255/20784* (2013.01); *B01D 2255/40* (2013.01); *B01D 2255/402* (2013.01); *B01D 2255/407* (2013.01); *B01D 2255/902* (2013.01); *B01D 2256/12* (2013.01); *B01D 2257/104* (2013.01); *B01D 2258/06* (2013.01); *B01D 2325/023* (2013.01); *B01J 2219/24* (2013.01); *C01B 13/0255* (2013.01); *C04B 2111/0081* (2013.01); *C04B 2111/00612* (2013.01); *C04B 2111/00801* (2013.01); *C04B 2235/3208* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3234* (2013.01); *C04B 2235/3243* (2013.01); *C04B 2235/3246* (2013.01); *C04B 2235/3262* (2013.01); *C04B 2235/3268* (2013.01); *C04B 2235/3272* (2013.01); *C04B 2235/3274* (2013.01); *C04B 2235/3275* (2013.01); *C04B 2235/5445* (2013.01); *C04B 2235/768* (2013.01); *C04B 2235/80* (2013.01); *Y10T 428/1314* (2015.01); *Y10T 428/24997* (2015.04); *Y10T 428/24999* (2015.04)

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,770,621 A | 11/1973 | Collins et al. |
| 3,861,723 A | 1/1975 | Kunz et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,702,959 A * | 12/1997 | Hutter ............... H01L 21/761 148/DIG. 109 |
| 5,707,911 A | 1/1998 | Rakhimov et al. |
| 5,712,220 A * | 1/1998 | Carolan ............... B01D 53/228 502/324 |
| 5,733,435 A * | 3/1998 | Prasad ............... B01D 53/22 204/421 |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| RE37,134 E | 4/2001 | Wilson |
| 6,214,066 B1 | 4/2001 | Nataraj et al. |
| 6,214,314 B1 | 4/2001 | Abbott |
| 6,290,757 B1 | 9/2001 | Lawless |
| 6,293,084 B1 | 9/2001 | Drnevich et al. |
| 6,296,686 B1 | 10/2001 | Prasad et al. |

(56) References Cited

U.S. PATENT DOCUMENTS

| | | |
|---|---|---|
| 6,352,624 B1 | 3/2002 | Crome et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 6,191,573 B1 | 11/2013 | Garing et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,238,201 B2 * | 1/2016 | Kelly .................. C01B 3/384 |
| 2002/0073938 A1 | 6/2002 | Bool et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte et al. |
| 2004/0065541 A1 | 4/2004 | Sehlin |
| 2004/0089973 A1 | 5/2004 | Hoang |
| 2004/0164280 A1 * | 8/2004 | Singla .................. C04B 35/016 252/500 |
| 2004/0221722 A1 | 11/2004 | Prasad et al. |
| 2005/0037299 A1 | 2/2005 | Gottzmann |
| 2005/0048343 A1 * | 3/2005 | Thirukkvalur ........ H01M 8/023 429/454 |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 * | 4/2007 | Hiwatashi ........... H01M 4/9016 429/489 |
| 2007/0104793 A1 | 5/2007 | Akash |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy et al. |
| 2007/0259252 A1 * | 11/2007 | Koc .................... H01M 4/9016 429/489 |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana et al. |
| 2008/0141672 A1 | 6/2008 | Shah et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0011323 A1 * | 1/2009 | Guan .................. H01M 4/8885 429/469 |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0193104 A1 | 8/2010 | Ryu et al. |
| 2010/0200418 A1 | 8/2010 | Licht |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |

(56) References Cited

U.S. PATENT DOCUMENTS

| | | | |
|---|---|---|---|
| 2011/0120127 A1 | 5/2011 | Lippmann et al. | |
| 2011/0132367 A1 | 6/2011 | Patel | |
| 2011/0142722 A1 | 6/2011 | Hemmings et al. | |
| 2011/0143255 A1 | 6/2011 | Jain et al. | |
| 2011/0180399 A1 | 7/2011 | Christie et al. | |
| 2011/0195342 A1* | 8/2011 | Luo | B01D 53/228 429/495 |
| 2011/0200520 A1 | 8/2011 | Ramkumar | |
| 2011/0240924 A1 | 10/2011 | Repasky | |
| 2011/0253551 A1 | 10/2011 | Lane et al. | |
| 2012/0000360 A1 | 1/2012 | Richet et al. | |
| 2012/0067060 A1 | 3/2012 | Greeff | |
| 2013/0009100 A1 | 1/2013 | Kelly et al. | |
| 2013/0009102 A1 | 1/2013 | Kelly et al. | |
| 2013/0015405 A1 | 1/2013 | Quintero et al. | |
| 2013/0072374 A1 | 3/2013 | Lane et al. | |
| 2013/0072375 A1 | 3/2013 | Lane et al. | |
| 2013/0156958 A1 | 6/2013 | Belov et al. | |
| 2014/0044604 A1 | 2/2014 | Lane et al. | |
| 2014/0056774 A1 | 2/2014 | Kelly et al. | |
| 2014/0060643 A1 | 3/2014 | Martin et al. | |
| 2014/0183866 A1 | 7/2014 | Kromer et al. | |
| 2014/0206779 A1 | 7/2014 | Lackner et al. | |
| 2014/0271393 A1* | 9/2014 | Nazarpoor | B01J 23/002 422/177 |
| 2014/0319424 A1 | 10/2014 | Chakravarti et al. | |
| 2014/0319427 A1 | 10/2014 | Chakravarti et al. | |
| 2014/0323597 A1 | 10/2014 | Stuckert et al. | |
| 2014/0323598 A1 | 10/2014 | Chakravarti et al. | |
| 2014/0323599 A1 | 10/2014 | Chakravarti et al. | |
| 2015/0096506 A1* | 4/2015 | Kelly | B01J 8/067 122/32 |
| 2015/0098868 A1* | 4/2015 | Kelly | B01J 8/067 422/115 |
| 2015/0098872 A1* | 4/2015 | Kelly | B01J 8/067 422/187 |

FOREIGN PATENT DOCUMENTS

| | | |
|---|---|---|
| EP | 0989093 A2 | 3/2000 |
| EP | 1504811 A1 | 2/2005 |
| EP | 1743694 A1 | 1/2007 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| WO | WO 9842636 | 10/1998 |
| WO | WO 0017418 | 3/2000 |
| WO | WO 0109059 A1 | 2/2001 |
| WO | WO 2007060141 | 5/2007 |
| WO | WO 2007086949 | 8/2007 |
| WO | WO 2008024405 | 2/2008 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013062413 A1 | 5/2013 |
| WO | WO 2013089895 A1 | 6/2013 |
| WO | WO 2014074559 A1 | 5/2014 |
| WO | WO 2014077531 A1 | 5/2014 |
| WO | WO 2014107707 A2 | 7/2014 |
| WO | WO 2014176022 A1 | 10/2014 |

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of $CO_2$ in a Solid Oxide Electrolyzer" Electrochemical and Solid State Letters, vol. 11, No. 9, Jun. 20, 2008, pp. B167-B170, XP002644615.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with $CO_2$ Recovery", Final Report (Feb. 2002).

The U.S. Department of Energy—Office of Fossil Energy and U.S. Department of Energy/NETL, "Evaluation of Innovative Fossil Fuel Power Plants with $CO_2$ Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004, JW Marriott Hotel, Washington, DC, pp. 1-10.

Friedmann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catytic Coatings on Different Substrates, Including Microstructured Channels: Preparation, Deposition Techniques, Applications", Recent Patents on Chemical Engineering, 2012, pp. 28-44.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a $CO_2$ Recovery Power Plant by Burning Pulverized Coal in $O_2/CO_2$, Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768, ISSN: 0167-2738.

* cited by examiner

COMPOSITE OXYGEN TRANSPORT MEMBRANE

CROSS REFERENCE TO RELATED APPLICATIONS

The present application is a continuation-in-part of and claims benefit and priority of U.S. application Ser. No. 14/322,981 which was filed on Jul. 3, 2014 and which is a continuation of U.S. application Ser. No. 13/644,666, filed on Oct. 12, 2012, now U.S. Pat. No. 8,795,417, which claims priority to and the benefit of U.S. provisional patent application Ser. No. 61/576,108 filed Dec. 15, 2011.

GOVERNMENT SUPPORT

This invention was made with Government support under Cooperative Agreement No. DE-FC26-07NT43088, awarded by the United States Department of Energy. The Government has certain rights in this invention.

FIELD OF THE INVENTION

The present invention relates to a method of forming a composite oxygen transport membrane and the composite oxygen transport membrane itself in which a porous fuel oxidation layer, a dense separation layer, and a porous surface activation layer are formed on a porous support from mixtures of $(Ln_{1-x}A_x)_wCr_{1-y}B_yO_{3-\delta}$ and a doped zirconia. The invention also relates to such a method in which the separation layer is sintered to full density in nitrogen atmosphere. The term "nitrogen atmosphere" means an atmosphere with oxygen partial pressure between about 0.1 and 1000 Pa

BACKGROUND OF THE INVENTION

Oxygen transport membranes function to separate oxygen from air or other oxygen containing gases by transporting oxygen ions through a material that is capable of conducting oxygen ions and electrons at elevated temperatures. When a partial pressure difference of oxygen is applied on opposite sides of such a membrane, oxygen ions will ionize on one surface of the membrane and emerge on the opposite side of the membrane and recombine into elemental oxygen and release electrons. The free electrons resulting from the combination will be transported back through the membrane to ionize the oxygen. The partial pressure difference can be produced by providing the oxygen containing feed to the membrane at a positive pressure or by combusting a fuel or other combustible substance in the presence of the separated oxygen on the opposite side of the membrane or a combination of the two methods. It is to be noted that the combustion will produce heat that is used to raise the temperature of the membrane to an operational temperature at which the oxygen ion transport can occur and also, to supply heat to an industrial process that requires heating. Moreover, whether or not heat is required for a process, the combustion itself can produce products such as synthesis gases by means of partial oxidation of a fuel or other combustible substance occasioned as a result of the combustion.

Oxygen transport membranes can utilize a single phase mixed conducting material such as a perovskite to conduct the electrons and transport the oxygen ions. While perovskite materials with high ambi-polar conductivity, such as $La_{1-x}Sr_xCo_{1-y}Fe_yO_{3-\delta}$ or $Ba_{1-x}Sr_xCo_{1-y}Fe_yO_{3-\delta}$, can exhibit a high oxygen flux, such materials tend to be very fragile under operational conditions involved where a fuel or other combustible substance is used to produce the partial pressure difference. This is because the perovskite will have a variable stoichiometry with respect to oxygen or decompose in reducing atmosphere, which makes the material unsuitable for processes in which a reducing fuel is introduced. In order to overcome this problem, a two-phase mixture of more stable materials can be used in which a primarily ionic conductor is provided to conduct the oxygen ions and a primarily electronic conductor is used to conduct the electrons. The primarily ionic conductor can be a fluorite such as a stabilized zirconia and the primarily electronic conductor can be a perovskite which contains Cr and therefore more stable than the Co-containing perovskite materials. Where the primarily ionic conductor is a fluorite, this chemical expansion is less problematical.

Typically, oxygen transport membranes are composite, also known as supported thick film, structures that include a dense separation layer composed of the two phases of materials, a porous fuel oxidation layer located between the dense separation layer and a porous support layer and a porous surface activation layer located opposite to the porous fuel oxidation layer and on the other side of the dense separation layer. All of these layers are supported on a porous support, or porous supporting substrate. The dense separation layer is where the oxygen ion transport principally occurs. Although defects in the dense separation layer can occur that enable the passage of gas through such layer, it is intended to be gas tight and therefore, not porous. Both the porous surface activation layer and the porous fuel oxidation layers are "active", that is, they are formed from materials that permit the transport of oxygen ions and the conduction of electrons. Since the resistance to oxygen ion transport is dependent on the thickness of the membrane, the dense separation layer is made as thin as possible and therefore must be supported in any case. The porous fuel oxidation layer enhances the rate of fuel oxidation by providing a high surface area where fuel can react with oxygen or oxygen ions. The oxygen ions diffuse through the mixed conducting matrix of this porous layer towards the porous support and react with the fuel that diffuses inward from the porous support into the porous fuel oxidation layer. The porous surface activation layer enhances the rate of oxygen incorporation by enhancing the surface area of the dense separation layer while providing a path for the resulting oxygen ions to diffuse through the oxygen ion conducting phase to the dense separation layer and for oxygen molecules to diffuse through the open pore space to the dense separation layer. The surface activation layer therefore, reduces the loss of driving force in the oxygen incorporation process and thereby increases the achievable oxygen flux. Preferably, the porous fuel oxidation layer and the porous surface exchange layer are formed from similar electronic and ionic phases as the dense separation layer to provide a close thermal expansion match between the layers.

U.S. Pat. No. 7,556,676 describes a composite oxygen ion transport membrane. In order to form a dense, gas impermeable dual phase membrane layer from these materials the membrane needs to contain vanadium, and be sintered in a furnace atmosphere containing a mixture of hydrogen and nitrogen. From a cost perspective for high volume manufacturing it would be preferable to sinter in an atmosphere which does not contain hydrogen. From an environmental viewpoint it would be beneficial to eliminate vanadium. The materials of both the porous intermediate fuel oxidation layer and the porous air side surface exchange layers described in this patent have shown a tendency to densify during prolonged usage at high temperatures. Densification of these layers results in degradation of oxygen flux through the membrane due to loss of surface area and therefore active reaction site.

U.S. Pat. No. 8,795,417 B2 provides a method of producing a composite oxygen ion membrane consisting of a porous fuel oxidation layer and a dense separation layer and optionally, a porous surface exchange layer from mixtures of $(Ln_{1-x}A_x)_wCr_{1-y}B_yO_{3-\delta}$ and a doped zirconia. In the porous fuel oxidation layer and the optional porous surface exchange layer, A is Calcium and in the dense separation layer A is not calcium and preferably strontium. The typical materials are $(La_{0.8}Ca_{0.2})_{0.95}Cr_{0.5}Mn_{0.5}O_{3-\delta}$ (LCCM55) for the porous fuel oxidation and optional porous surface exchange layers and $(La_{0.8}Sr_{0.2})_{0.95}Cr_{0.5}Fe_{0.5}O_{3-\delta}$ (LSCF55) for the dense separation layer.

Since Ca-containing perovskite materials are more refractory than Sr-containing ones, the idea was to sinter the separation layer to full density while maintaining a porous fuel activation layer without using pore former. However, it was later found out that although the fuel activation layer remained porous, the separation layer was difficult to sinter to full density in air. Moreover, the shrinkage mismatch between the fuel activation layer and the separation layer resulted in residual stress in the membrane which caused the membrane to delaminate from the porous substrate.

As will be discussed the present invention provides a method of manufacturing a composite oxygen ion transport membrane and the membrane structure resulting from such manufacturing methods that among other advantages incorporates materials that enable fabrication to be accomplished in a more cost effective manner than in the prior art and also, will be more durable than prior art membranes.

SUMMARY OF THE INVENTION

The present invention provides a method of manufacturing an oxygen ion composite membrane. In accordance with such method, a first layer containing a first mixture of particles of $(Ln_{1-x}A_x)_wCr_{1-y}B_yO_{3-\delta}$, doped zirconia and pore formers is formed on a porous support. Ln is La, Y, Pr, Ce or Sm, A is Ca or Sr, B is Fe, Mn, Co, Al, Ti or combinations thereof, w is from about 0.9 to about 1.0, x is from about 0.1 to about 0.3 and y is from about 0.1 to about 0.6. The first mixture contains the $(Ln_{1-x}A_x)_wCr_{1-y}B_yO_{3-\delta}$ and the doped zirconia such that when sintered, the first layer will contain the $(Ln_{1-x}A_x)_wCr_{1-y}B_yO_{3-\delta}$ and the doped zirconia in a first volume percentage of $(Ln_{1-x}A_x)_wCr_{1-y}B_yO_{3-\delta}$ from about 30% to about 70% of the total solid mass. A second layer is formed on the first layer that contains a second mixture of particles of $(Ln_{1-x}A_x)_wCr_{1-y}B_yO_{3-\delta}$ and the doped zirconia. In one embodiment this second mixture of particles is substantially free of pore formers. In another embodiment, the second mixture of particles does not contain pore formers. In such mixture, Ln is La, Y, Pr, Ce or Sm, A is Ca or Sr, and B is Fe, Mn, Co, Al, Ti or combinations thereof, w is from about 0.9 to about 1.0, x is from about 0.1 to about 0.3 and y is from about 0.3 to about 0.7. The second mixture contains the $(Ln_{1-x}A_x)_wCr_{1-y}B_yO_{3-\delta}$ and the doped zirconia such that when sintered, the second layer will contain the $(Ln_{1-x}A_x)_wCr_{1-y}B_yO_{3-\delta}$ and the doped zirconia in a second volume percentage of $(Ln_{1-x}A_x)_wCr_{1-y}B_yO_{3-\delta}$ of from about 30% to about 70% of the total solid mass. The first layer and the second layer and porous support are heated in nitrogen so that said first layer partially sinters into a porous mass containing the first mixture of particles, thereby to provide a porous fuel oxidation layer and the second layer sinters fully into a densified mass containing the second mixture of particles, thereby to provide a dense separation layer. While maintaining a fully densified separation layer, the porosity of the first layer can be controlled by adjusting either the amount of pore formers or the Cr content in the perovskite material.

As can be appreciated from the above discussion, since the composite membrane of the present invention is formed by sintering the layers in nitrogen, or a nitrogen atmosphere, a hydrogen-containing sintering atmospheres is not required, which reduces the cost of fabricating such a composite membrane of the present invention. The term "nitrogen atmosphere" means an atmosphere with oxygen partial pressure of from about 0.1 to about 1000 Pa.

In addition to the foregoing, a third layer can be formed on the second layer containing a third mixture of particles of $(Ln_{1-x}A_x)_wCr_{1-y}B_yO_{3-\delta}$ and the doped zirconia and pore formers. Again, for such mixture, Ln is La, Y, Pr, Ce or Sm, A is Ca or Sr, B is Fe, Mn, Co, Al, Ni or combinations thereof, w is from about 0.9 to about 1.0, x is from about 0.1 to about 0.3 and y is from about 0.4 to about 0.8. The third mixture has a third volume percentage of the $(Ln_{1-x}A_x)_wCr_{1-y}B_yO_{3-\delta}$ and the doped zirconia such that, when sintered, the third layer will contain the $(Ln_{1-x}A_x)_wCr_{1-y}B_yO_{3-\delta}$ and the doped zirconia in a third volume percentage of $(Ln_{1-x}A_x)_wCr_{1-y}B_yO_{3-\delta}$ from about 30% to about 70% of the total solid mass. The third layer is sintered in air at a temperature of about 1300° C. such that the third layer is porous. In one embodiment, the doped zirconia is 10 mol % scandia and 1 mol % yttria doped zirconia (10Sc1YSZ) or 10 mol % scandia and 1 mol % ceria doped zirconia (10Sc1CeSZ).

The $(Ln_{1-x}A_x)_wCr_{1-y}B_yO_{3-\delta}$ within the first mixture of particles can be $(La_{1-x}Sr_x)_wCr_{1-y}Fe_yO_{3-\delta}$, where w is 0.95, x is 0.2 and y is 0.3. The $(Ln_{1-x}A_x)_wCr_{1-y}B_yO_{3-\delta}$ within the second mixture of particles can be $(La_{1-x}Sr_x)_wCr_{1-y}Fe_yO_{3-\delta}$, where w is 0.95, x is 0.2 and y is 0.5. The $(Ln_{1-x}A_x)_wCr_{1-y}B_yO_{3-\delta}$ within the third mixture of particles can be $(La_{1-x}Sr_x)_wCr_{1-y}Fe_yO_{3-\delta}$, where w is 0.95, x is 0.2 and y is 0.7. Moreover, the sintered porous support is formed from an yttria stabilized zirconia with yttria content of from about 3-6 mol %, in another embodiment from about 4-5 mol % or a mixture of MgO and MgAl$_2$O$_4$.

In one embodiment, the first volume percentage of $(La_{1-x}Sr_x)_wCr_{1-y}Fe_yO_{3-\delta}$ is about 60% of the total solid mass, the second volume percentage of $(La_{1-x}Sr_x)_wCr_{1-y}Fe_yO_{3-\delta}$ is about 50% of the total solid mass and the third volume percentage of $(La_{1-x}Sr_x)_wCr_{1-y}Fe_yO_{3-\delta}$ is about 60% of the total solid mass. The porous support can be of tubular or planar configuration. In one specific embodiment, the porous support is formed of 4 mol % Yttria Stabilized Zirconia (4YSZ) and fired at a temperature of about 1050° C., so that it is not fully sintered prior to forming the first layer on the porous support. In such an embodiment, the first layer is formed on the porous support and dried at ambient temperature. The second layer is then formed on the first layer. The first layer, the second layer and the porous support are then sintered at a temperature of about 1400° C. in nitrogen. Additionally, the third layer can be formed on the second layer and be sintered at a temperature of from about 1250° C. to about 1350° C. in air. Alternatively, the first layer, the second layer and the third layer can be sintered at a temperature of about 1400° C. in nitrogen. In any embodiment of the present invention, the first layer, the second layer and/or the third layer can be formed by any an conventional coating method. In one embodiment, the first layer, the second layer and/or the third layer are formed by slurry coating.

The present invention also provides an oxygen ion composite membrane that comprises first and second layers on a porous support providing a porous fuel oxidation layer and a dense separation layer, respectively. Each of the first and second layers contain a mixture of $(Ln_{1-x}A_x)_wCr_{1-y}B_yO_{3-\delta}$ and doped zirconia, where for the first of the layers, Ln is La, Y, Pr, Ce or Sm, A is Ca or Sr, B is Fe, Mn, Co, Al, Ti or combinations thereof, w is from about 0.9 to about 1.0, x is from about 0.1 to about 0.3 and y is from about 0.1 to about 0.6 and for the second of the layers, Ln is La, Y, Pr, Ce or Sm, A is Ca or Sr, and B is Fe, Mn, Co, Al, Ti or combinations thereof, w is from about 0.9 to about 1.0, x is from about 0.1 to about 0.3 and y is from about 0.3 to about 0.7. The first of the layers contains the $(Ln_{1-x}A_x)_wCr_{1-y}B_yO_{3-\delta}$ and the doped zirconia in a first volume percentage of $(Ln_{1-x}A_x)_wCr_{1-y}B_yO_{3-\delta}$ of from about 30% to about 70% of the total solid mass. The second of the layers contains the $(Ln_{1-x}A_x)_wCr_{1-y}B_yO_{3-\delta}$ and the doped zirconia in a second volume percentage of $(Ln_{1-x}A_x)_wCr_{1-y}B_yO_{3-\delta}$ from about 30% to about 70% of the total solid mass.

A third layer can be situated on the second layer to form a porous surface exchange layer and that also contains the mixture of $(Ln_{1-x}A_x)_wCr_{1-y}B_yO_{3-\delta}$ and the doped zirconia. In such layer, Ln is La, Y, Pr, Ce or Sm, A is Ca or Sr, B is Fe, Mn, Co, Ni, Al, or combinations thereof, w is from about 0.9 to about 1.0, x is from about 0.1 to about 0.3 and y is from about 0.4 to about 0.8. The third layer contains the $(Ln_{1-x}A_x)_wCr_{1-y}B_yO_{3-\delta}$ and the doped zirconia in a third volume percentage of $(Ln_{1-x}A_x)_wCr_{1-y}B_yO_{3-\delta}$ between about 30% and about 70% of the total solid mass.

Further, the doped zirconia can be 10Sc1YSZ or 10Sc1CeSZ. Preferably, the $(Ln_{1-x}A_x)_wCr_{1-y}B_yO_{3-\delta}$ within the first layer is $(La_{0.8}Sr_{0.2})_{0.95}Cr_{0.7}Fe_{0.3}O_{3-\delta}$; the $(La_{1-x}A_x)_wCr_{1-y}B_yO_{3-\delta}$ within the second layer is preferably $(La_{0.8}Sr_{0.2})_{0.95}Cr_{0.5}Fe_{0.5}O_{3-\delta}$; and the $(La_{1-x}A_x)_wCr_{1-y}B_yO_{3-\delta}$ within the third layer is preferably $(La_{0.8}Sr_{0.2})_{0.95}Cr_{0.3}Fe_{0.7}O_{3-\delta}$. Additionally, preferably, the first volume percentage of $(Ln_{1-x}A_x)_wCr_{1-y}B_yO_{3-\delta}$ is about 60% of the total solid mass; the second volume percentage of $(Ln_{1-x}A_x)_wCr_{1-y}B_yO_{3-\delta}$ is about 50% of the total solid mass; and the third volume percentage of $(Ln_{1-x}A_x)_wCr_{1-y}B_yO_{3-\delta}$ is about 60% of the total solid mass. In any embodiment of the present invention and in any aspect, the porous support is of tubular configuration.

BRIEF DESCRIPTION OF THE DRAWINGS

While the specification concludes with claims distinctly pointing out the subject matter that the inventors regard as their invention, it is believed that the invention will be better understood when taking in connection FIG. 1, which is a cross-sectional micrograph of a composite oxygen ion transport membrane.

DETAILED DESCRIPTION

Figure 1:
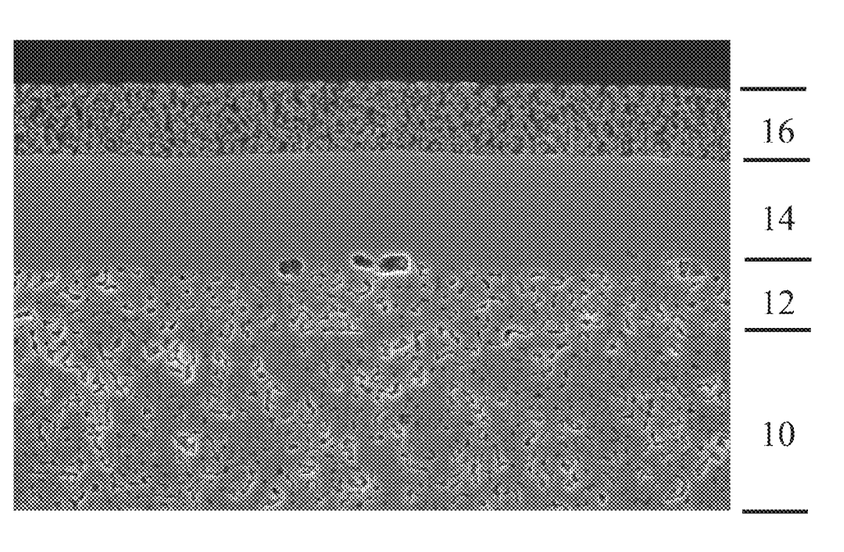

FIG. 1 illustrates a cross-sectional micrograph of a composite oxygen transport membrane 1 of the invention. Composite oxygen transport membrane 1 has a porous support layer 10. Applied to the porous support layer 10 is a first layer 12, a second layer 14 and a third layer 16. The composite oxygen transport membrane is specifically designed to function in an environment in which a fuel or other combustible substance is introduced to the porous support layer 10, on the side opposite to the first, second and third layer 12, 14 and 16, and subjected to combustion supported by permeated oxygen to both provide the partial pressure difference necessary to drive oxygen ion transport and also to heat the membrane to an operational temperature at which oxygen ion transport will occur. In this regard, the term "fuel" when used in connection with this layer, both herein and in the claims, is not intended to be limiting, but rather, to indicate and include any substance that can be oxidized through permeation of oxygen through the membrane. The second layer 14 is the active layer at which oxygen ion transport principally occurs and as such, serves as dense separation layer that is impervious to gas, but allows oxygen ion transport. The third layer 16 serves to initially reduce the oxygen and thus serves as a porous surface activation layer. Each of the first layer 12, the second layer 14 and the third layer 16 after heating and sintering will preferably each have a thickness of between about 10 μm and about 50 μm.

The porous support layer 10 could be formed from partially stabilized zirconia oxide e.g. from about 3 and 6 mol % yttria stabilized zirconia or fully stabilized zirconia e.g. 15 mol % calcia stabilized zirconia. Partially doped zirconia with yttria content lower than 4 mol % tends to experience a tetragonal-to-monoclinic phase transformation at ambient temperature, especially when under stress or in the presence of water vapor. The phase transformation is accompanied by about 5% volume increase and results in cracking of the porous support or delamination of the coating layers from the porous support. Alternatively the porous substrate can be formed from a mixture of MgO and $MgAl_2O_4$. Alternatively the porous substrate could be a porous metal. In this regard, although not part of the present invention, as would be appreciated by those skilled in the art, porous support layer 10 should provide as open an area as possible while still being able to be structurally sound in its supporting function.

Porous support structures for application in composite oxygen transport membranes are best characterized in terms of their porosity, strength and effective oxygen diffusivity. The porous support forms the mechanical support for the "active" membrane layers so should have sufficient strength at high temperatures. A typical support structure in this application would have total porosity in the range of from about 20 to about 50% by volume. An important property of the porous substrate is the ability to allow gaseous species to readily move through the porous support structure to and from the membrane 'active' layers e.g. $H_2$, CO, $H_2O$ and $CO_2$. The ability of the substrate to allow gaseous transport can be characterized as an effective oxygen diffusivity, $D_{eff\ O2-N2}$. For this application it has been determined that a $D_{eff\ O2-N2}$ more than 0.005 $cm^2$/s measured at room temperature is preferred. The porous substrate should also possess a thermal expansion coefficient not more than 10% different from that of the membrane 'active' layers between room temperature and membrane operation temperature.

A stabilized zirconia, namely, $Zr_{1-x-y}A_xB_yO_{2-\delta}$ is a common material in all three "active" membrane layers, namely, the first layer 12, the second layer 14 and the third layer 16. As mentioned above in all of these layers oxygen ion transport occurs and as such, are "active". In order to generate industrially relevant levels of oxygen ion conductivity, A and B are typically Sc, Y, Ce, Al or Ca. Preferably, such stabilized zirconia has a composition given by the formula: $Zr_{0.802}Sc_{0.180}Y_{0.018}O_{2-\delta}$ or $Zr_{0.809}Sc_{0.182}Ce_{0.009}O_{2-\delta}$, often noted as 10Sc1YSZ or 10Sc1CeSZ, respectively, in literature associated with this class of membrane. However it should be noted that many different combinations of Sc, Y, Ce, Al, Ca or other elements can be substituted to achieve the same end.

Turning first to the first layer 12, this layer is formed from a first mixture of particles of $(Ln_{1-x}A_x)_wCr_{1-y}B_yO_{3-\delta}$ and 10Sc1YSZ and pore formers. In this layer, Ln is La, Y, Pr, Ce or Sm, A is Ca or Sr, B can be Mn, Fe, Co Al, Ti or combinations thereof, w is from about 0.9 to about 1.0, x is from about 0.1 to about 0.3 and y is from about 0.1 to about 0.6. The preferred composition of material for this layer is $(La_{0.8}Sr_{0.2})_{0.95}Cr_{0.7}Fe_{0.3}O_{3-\delta}$. The $(La_{1-x}A_x)_wCr_{1-y}B_yO_{3-\delta}$ and 10Sc1YSZ should be present within a first volume percentage of $(La_{1-x}A_x)_wCr_{1-y}B_yO_{3-\delta}$ of from about 30% to about 70% of the total sintered mass. In one embodiment, the first volume percentage of $(La_{1-x}A_x)_wCr_{1-y}B_yO_{3-\delta}$ is about 60%.

The second layer 14 is formed of a second mixture of particles of $(Ln_{1-x}A_x)_wCr_{1-y}B_yO_{3-\delta}$ and 10Sc1YSZ. The function of the second layer 14 is to be a gas separation layer that is impervious to gas molecules but should be conductive to oxygen ions and electrons. In this layer, Ln is La, Y, Pr, Ce or Sm, A is Ca or Sr, B is Mn, Fe, Co Al, Ti or combinations thereof, x is from about 0.1 to about 0.3, y is from about 0.3 to about 0.7 and w is from about 0.9 to about 1.0. The preferred composition of material for this layer is $(La_{0.8}Sr_{0.2})_{0.95}Cr_{0.5}Fe_{0.5}O_{3-\delta}$. Within the second mixture of particles, the $(Ln_{1-x}A_x)_wCr_{1-y}B_yO_{3-\delta}$ and 10Sc1YSZ should be present within a second volume percentage of $(Ln_{1-x}A_x)_wCr_{1-y}B_yO_{3-\delta}$ of from about 30% to about 70% of the total sintered mass. In one embodiment, the second volume percentage is about 50% of $(Ln_{1-x}A_x)_wCr_{1-y}B_yO_{3-\delta}$.

The third layer 16, that serves as the porous surface exchange layer, is formed of a third mixture of particles of $(Ln_{1-x}A_x)_wCr_{1-y}B_yO_{3-\delta}$ and 10Sc1YSZ. In this layer, Ln is La, Y, Pr, Ce or Sm, A is Ca or Sr, B can be Mn, Fe, Co Al, Ni or combinations thereof; w is from about 0.9 to about 1.0, x is from about 0.1 to about 0.3 and y is from about 0.4 to about 0.8. In one embodiment the composition of material for this layer is $(La_{0.8}Sr_{0.2})_{0.95}Cr_{0.3}Fe_{0.7}O_{3-\delta}$. The $(Ln_{1-x}A_x)_wCr_{1-y}B_yO_{3-\delta}$ and 10Sc1YSZ should be present within a third volume percentage of $(Ln_{1-x}A_x)_wCr_{1-y}B_yO_{3-\delta}$ of from about 30% to about 70% of the total sintered mass. In one embodiment, the third volume percentage of $(Ln_{1-x}A_x)_wCr_{1-y}B_yO_{3-\delta}$ is about 60%. The high Fe content in the perovskite phase and the volume ratio of the two phases in the mixture help keep the loss of driving force for oxygen reduction low while maintaining a stable microstructure during long-term operation at high temperatures.

As an example of forming the composite oxygen ion transport membrane 1, the perovskite material $(La_{0.8}Sr_{0.2})_{0.95}Cr_{0.5}Fe_{0.5}O_{3-\delta}$ (LSCrF55) for the second layer 14, the gas separation layer, can be obtained from NexTech Materials, Ltd., Lewis Center, Ohio and $Zr_{0.802}Sc_{0.180}Y_{0.018}O_{2-\delta}$ (10Sc1YSZ) can be obtained from Daiichi Kigenso Kagaku Kogyo Co., Ltd, Osaka, Japan through their US agent Sojitz, Ltd, in New York, United States of America. The perovskite phase LSCrF55 can have a particle size $D_{50}$ in the range of from about 0.3 to 0.5 μm, the 10Sc1YSZ should have a $D_{50}$ of less than 0.6 μm. In order to fabricate a 70 gram batch of gas separation layer slurry, 36.75 gram of LSCrF55 are mixed with 33.25 gram of 10Sc1YSZ, 36 gram Ferro B73210 binder, 170 gram toluene and 1200 gram of 1.5 mm diameter YSZ milling media in a 500 ml NALGENE bottle. The mixture is milled until the particle size of the mixture is in the range of from about 0.3 to 0.5 μm. The perovskite material $(La_{0.8}Sr_{0.2})_{0.95}Cr_{0.7}Fe_{0.3}O_{3-\delta}$ (LSCrF73) for the first layer 12, the fuel oxidation layer, is also obtained from NexTech Materials, Ltd., Lewis Center, Ohio and the 10Sc1YSZ can also be obtained from Daiichi Kigenso Kagaku Kogyo Co. Ltd, Osaka, Japan through their US agent Sojitz, Ltd, in New York. The perovskite phase LSCrF73 is specified as having a particle size $D_{50}$ in the range of from about 0.3 to 0.5 μm, the 10Sc1YSZ should have a $D_{50}$ of less than 0.6 μm as received. In order to prepare a 180 gram batch of fuel oxidation layer slurry, 112.32 gram of LSCrF73, 67.68 gram of 10Sc1YSZ, 150 gram of toluene, 30 gram of Ferro B73210 binder, and 1200 gram of 1.5 mm diameter YSZ grinding media are added in a 500 ml NALGENE bottle. The mixture is then milled for about 6 hours to form a slurry having a particle size $d_{50}$ of from about 0.3 to about 0.5 μm. About 4.5 gram of carbon black having a particle size of about $d_{50}$ of 0.8 μm and 0.3 gram of surfactant KD-1 dissolved in 15 gram of toluene are then added to the slurry and milled for additional 2 hours. To prepare the surface exchange layer slurry, 80 gram of the electronic and ionic mixture having $(La_{0.8}Sr_{0.2})_{0.95}Cr_{0.3}Fe_{0.7}O_{3-\delta}$ (LSCrF37) and 10Sc1YSZ is prepared so that the mixture contains about 60% of LSCrF37 and about 40% of 10Sc1YSZ by volume. To the mixture, 28.8 gram of toluene, 19.2 gram of ethyl alcohol, 16 gram of the same Ferro binder mentioned above, 1.6 gram of surfactant KD-1, and about 500 gram of 1.5 mm diameter YSZ grinding media are added and the resultant mixture is milled for about 2 hours to form a slurry having a particle size $d_{50}$ of from about 0.3 to about 0.5 μm. About 12 gram of carbon black are added to the slurry and it is milled for additional 2 hours.

In order to form a composite oxygen transport membrane 1 from these slurries the slurries are deposited on a porous support 10 by slurry coating followed by firing in nitrogen. The porous support 10 can be tubular and fabricated by an extrusion process. Although the porous support 10 can be fully sintered, it can first be fired at a low temperature e.g. at about 1000° C. after green forming such that some residual shrinkage remains when the coated substrate is fired again at higher temperatures. The first layer 12 is then deposited on the surface of the porous support layer 10 and the thickness is controlled by the speed at which the supporting substrate is dipped into the slurry. The first layer 12 is allowed to dry at ambient temperature. The second layer 14 is then applied on top of the first layer 12 by dipping the component into the gas separation slurry and allowed to dry. The coated tube is slowly heated in flowing nitrogen to about 1400° C. and held at the same temperature for about 6 hours for the membrane to sinter completely. During sintering, the oxygen partial pressure of the atmosphere in the furnace is controlled below 20 Pa. The tube is then cooled in nitrogen to complete the sintering process. The sintered tube is checked for flow coefficient, as defined below:

$$Cv = \frac{q}{0.471 N_2 p_1 \sqrt{\frac{1}{G_g T_1}}}$$

where q is the flow rate, $N_2$ is a constant, $p_1$ is the inlet pressure, $G_g$ is the gas specific gravity, and $T_1$ is the absolute upstream temperature. The Cv of the sintered tube should not exceed $1.5 \times 10^{-5}$. After this, the third layer 16 is applied by slurry coating the sintered three layer membrane structure and firing at a temperature of about 1300° C. in air. The third layer 16 could also be applied after drying of the dense layer, 14 and then all three active layers 12, 14, 16 co-fired together in one high temperature sintering step at a temperature of about 1400° C. in nitrogen. Combining the high temperature sintering steps for these three layers leads to lower manufacturing costs than can be achieved when using separate high temperature sintering steps for each of the three layers. The Cv of the tube after the sintering of the surface exchange layer is checked again to make sure no significant change has occurred.

The resultant tube has the preferred thickness, pore size and porosity within the ranges, namely, the fuel oxidation layer 12 has a thickness of from about 10 microns to about 50 microns, an average pore size of from about 0.1 microns to about 1 micron and a porosity of from about 25 percent to about 50 percent. The porous support layer 10 has a thickness of about 1 mm, an average pore size of from about 0.5 micron to about 3 microns and a porosity of from about 25 to 45 percent. The surface exchange layer 16 has a thickness of from about 10 microns to about 50 microns, an average pore size from about 0.1 microns to about 1 microns and a porosity of from about 25 percent to about 50 percent. The separation layer 14 has a thickness of from about 10 microns to about 50 microns, with substantially no connected porosity; in another embodiment with no connected porosity.

While the present invention has been described with reference to a preferred embodiment, as would occur to those skilled in the art, numerous changes, additions and omission may be made without departing from the spirit and scope of the present invention as set forth in the appended claims.

We claim:

1. A method of producing an oxygen ion composite membrane comprising:
    forming a first layer on a porous support containing a first mixture of particles of $(Ln_{1-x}A_x)_w Cr_{1-y}B_y O_{3-\delta}$ and doped zirconia and pore formers, where Ln is La, Y, Pr, Ce or Sm, A is Ca or Sr, B is Fe, Mn, Co, Al, Ti or combinations thereof, w is from about 0.9 to about 1.0, x is from about 0.1 to about 0.3 and y is from about 0.1 to about 0.6;
    the first mixture containing the $(Ln_{1-x}A_x)_w Cr_{1-y}B_y O_{3-\delta}$ and the doped zirconia such that when sintered, the first layer will contain the $(Ln_{1-x}A_x)_w Cr_{1-y}B_y O_{3-\delta}$ and the doped zirconia in a first volume percentage of $(Ln_{1-x}A_x)_w Cr_{1-y}B_y O_{3-\delta}$ of from about 30% to about 70% of the total solid mass;
    forming a second layer on the first layer that contains a second mixture of particles of $(Ln_{1-x}A_x)_w Cr_{1-y}B_y O_{3-\delta}$ and the doped zirconia and that does not contain pore formers, where Ln is La, Y, Pr, Ce or Sm, A is Ca or Sr, B is Fe, Mn, Co, Al, Ti or combinations thereof, w is from about 0.9 to about 1.0, x is from about 0.1 to about 0.3 and y is from about 0.3 to about 0.7;
    the second mixture containing the $(Ln_{1-x}A_x)_w Cr_{1-y}B_y O_{3-\delta}$ and the doped zirconia such that when sintered, the second layer will contain the $(Ln_{1-x}A_x)_w Cr_{1-y}B_y O_{3-\delta}$ and the doped zirconia in a second volume percentage of $(Ln_{1-x}A_x)_w Cr_{1-y}B_y O_{3-\delta}$ of from about 30% to about 70% of the total solid mass;
    heating the first layer, the second layer and the porous support in nitrogen atmosphere so that said first layer partially sinters into a porous mass containing the first mixture of particles, thereby to provide a porous fuel oxidation layer and the second layer fully sinters into a densified mass containing the second mixture of particles, thereby to provide a dense separation layer.

2. The method of claim 1, wherein:
    a third layer is formed on the second layer containing a third mixture of particles of $(Ln_{1-x}C_x)_w Cr_{1-y}B_y O_{3-\delta}$, the doped zirconia and pore formers, where Ln is La, Y, Pr, Ce or Sm, A is Ca or Sr, B is Fe, Mn, Co, Al, Ni or combinations thereof, w is from about 0.9 to about 1.0, x is from about 0.1 to about 0.3 and y is from about 0.4 to about 0.8;
    the third mixture having a third volume ratio of the $(Ln_{1-x}A_x)_w Cr_{1-y}B_y O_{3-\delta}$ and the doped zirconia such that when sintered, the third layer will contain the $(Ln_{1-x}A_x)_w Cr_{1-y}B_y O_{3-\delta}$ and the doped zirconia in a third volume percentage of $(Ln_{1-x}A_x)_w Cr_{1-y}B_y O_{3-\delta}$ of from about 30% to about 70% of the total solid mass; and
    the third layer is heated so that said third layer partially sinters into a porous mass containing the third mixture of particles, thereby to provide a porous surface exchange layer.

3. The method of claim 2, wherein the doped zirconia is 10Sc1YSZ or 10Sc1CeSZ.

4. The method of claim 3, wherein:
    the $(Ln_{1-x}A_x)_w Cr_{1-y}B_y O_{3-\delta}$ within the first mixture of particles is $(La_{1-x}Sr_x)_w Cr_{1-y}Fe_y O_{3-\delta}$, where w is 0.95, x is 0.2 and y is 0.3; the $(Ln_{1-x}A_x)_w Cr_{1-y}B_y O_{3-\delta}$ within the second mixture of particles is $(La_{1-x}Sr_x)_w Cr_{1-y}Fe_y O_{3-\delta}$, where w is 0.95, x is 0.2 and y is 0.5; the $(Ln_{1-x}A_x)_w Cr_{1-y}B_y O_{3-\delta}$ within the third mixture of particles is $(La_{1-x}Sr_x)_w Cr_{1-y}Fe_y O_{3-\delta}$, where w is 0.95, x is 0.2 and y is 0.7; and
    the porous support is formed from doped zirconium oxide or a mixture of MgO and $MgAl_2O_4$.

5. The method of claim 4, wherein the first volume percentage of $(Ln_{1-x}A_x)_w Cr_{1-y}B_y O_{3-\delta}$ is about 60% of the total solid mass, the second volume percentage of $(Ln_{1-x}A_x)_w Cr_{1-y}B_y O_{3-\delta}$ is about 50% of the total solid mass and the third volume percentage of $(Ln_{1-x}A_x)_w Cr_{1-y}B_y O_{3-\delta}$ is about 60% of the total solid mass.

6. The method of claim 5, wherein the porous support is of tubular or planar configuration.

7. The method of claim 6, wherein:
    the porous support is formed of 4YSZ and fired at a temperature of about 1050° C., so that it is not fully sintered prior to forming the first layer on the porous support;
    the first layer after having been formed on the porous support is dried at ambient temperature prior to coating the second layer on the first layer; and
    the first layer, the second layer and the porous support are sintered at a temperature of about 1400° C. in nitrogen.

8. The method of claim 7, wherein the third layer is sintered at a temperature of from about 1250° C. to about 1350° C. in air.

9. The method of claim 6, wherein the first layer, the second layer and the third layer are sintered at a temperature of about 1400° C. in nitrogen, and wherein said first layer, second layer and/or said third layer are optionally formed by slurry coating.

10. The method of claim 2, wherein the first layer, the second layer and/or the third layer are formed by slurry coating.

11. The method of claim 10, wherein the doped zirconia is 10Sc1YSZ or 10Sc1CeSZ.

12. The method of claim 11, wherein the porous support is 4YSZ.

13. An oxygen ion composite membrane comprising:

first and second layers on a porous support providing a porous fuel oxidation layer and a dense separation layer, respectively, for the oxygen ion composite membrane;

each of the first and second layers containing a mixture of $(Ln_{1-x}A_x)_wCr_{1-y}B_yO_{3-\delta}$ and doped zirconia, where for the first of the layers, Ln is La, Y, Pr, Ce or Sm, A is Ca or Sr, B is Fe, Mn, Co, Al, Ti or combinations thereof, w is 0.9-1.0, x is 0.1-0.3 and y is 0.1-0.6 and for the second of the layers, Ln is La, Y, Pr, Ce or Sm, A is Ca or Sr, and B is Fe, Mn, Co, Al or combinations thereof, w is 0.9-1.0, x is 0.1-0.3 and y is 0.3-0.7;

the first of the layers containing the $(Ln_{1-x}A_x)_wCr_{1-y}B_yO_{3-\delta}$ and the doped zirconia in a first volume percentage of $(Ln_{1-x}A_x)_wCr_{1-y}B_yO_{3-\delta}$ of from about 30% to about 70% of the total solid mass; and the second of the layers containing the $(Ln_{1-x}A_x)_wCr_{1-y}B_yO_{3-\delta}$ and the doped zirconia in a second volume percentage of $(Ln_{1-x}A_x)_wCr_{1-y}B_yO_{3-\delta}$ of from about 30% to about 70% of the total solid mass.

14. The oxygen ion composite membrane of claim 13, wherein:

a third layer is situated on the second layer to form a porous surface exchange layer and that also contains the mixture of $(Ln_{1-x}A_x)_wCr_{1-y}B_yO_{3-\delta}$ and the doped zirconia, where Ln is La, Y, Pr, Ce or Sm, A is Ca or Sr, B is Fe, Mn, Co, Al, Ni or combinations thereof, w is from about 0.9 to about 1.0, x is from about 0.1 to about 0.3 and y is from about 0.4 to about 0.8; and the third layer containing the $(Ln_{1-x}A_x)_wCr_{1-y}B_yO_{3-\delta}$ and the doped zirconia in a third volume percentage of $(Ln_{1-x}A_x)_wCr_{1-y}B_yO_{3-\delta}$ of from about 30% to about 70% of the total solid mass.

15. The oxygen ion composite membrane of claim 14, wherein the doped zirconia is 10Sc1YSZ or 10Sc1CeSZ.

16. The oxygen ion composite membrane of claim 15, wherein:

the $(Ln_{1-x}A_x)_wCr_{1-y}B_yO_{3-\delta}$ within the first layer is $(La_{1-x}Sr_x)_wCr_{1-y}Fe_yO_{3-\delta}$, where w is 0.95, x is 0.2 and y is 0.3;

the $(Ln_{1-x}A_x)_wCr_{1-y}B_yO_{3-\delta}$ within the second layer is $(La_{1-x}Sr_x)_wCr_{1-y}Fe_yO_{3-\delta}$, where w is 0.95, x is 0.2 and y is 0.5;

the $(Ln_{1-x}A_x)_wCr_{1-y}B_yO_{3-\delta}$ within the third layer is $(La_{1-x}Sr_x)_wCr_{1-y}Fe_yO_{3-\delta}$, where w is 0.95, x is 0.2 and y is 0.7; and the porous support is formed from stabilized zirconia oxide or a mixture of MgO and $MgAl_2O_4$.

17. The oxygen ion composite membrane of claim 13 or claim 16, wherein the first volume percentage of $(Ln_{1-x}A_x)_wCr_{1-y}B_yO_{3-\delta}$ is about 60% of the total solid mass, the second volume percentage of $(Ln_{1-x}A_x)_wCr_{1-y}B_yO_{3-\delta}$ is about 50% of the total solid mass and the third volume percentage of $(Ln_{1-x}A_x)_wCr_{1-y}B_yO_{3-\delta}$ is about 60% of the total solid mass.

18. The oxygen ion composite membrane of claim 16, wherein the porous support is of tubular or planar configuration.

19. The oxygen composite membrane of claim 17, wherein the porous support is formed from 4YSZ.

* * * * *